United States Patent [19]

Hayes

[11] Patent Number: 4,821,903
[45] Date of Patent: Apr. 18, 1989

[54] TRASH BIN CART AND BIN ASSEMBLY

[76] Inventor: James K. Hayes, 325 Cottage St., Rahway, N.J. 07065

[21] Appl. No.: 184,266

[22] Filed: Apr. 21, 1988

[51] Int. Cl.⁴ .............................................. B65D 90/00
[52] U.S. Cl. .................................... 220/1 T; 220/259;
220/255; 220/23.4; 280/47.34; 280/47.26;
280/47.19; 248/98
[58] Field of Search .............................. 220/1 T, 259;
280/47.34, 47.26, 47.19; 248/98

[56] References Cited

U.S. PATENT DOCUMENTS

| | | | |
|---|---|---|---|
| 2,984,500 | 10/1959 | Nolen | 280/47.26 |
| 3,214,120 | 8/1963 | McKee | 280/47.26 |
| 3,830,514 | 8/1974 | Green | 280/47.34 |
| 3,866,936 | 2/1975 | Hedges | 220/1 T |
| 3,934,894 | 1/1976 | Hoeffken | 280/47.19 |
| 4,749,158 | 6/1988 | Buckley | 248/98 |

Primary Examiner—Stephen Marcus
Assistant Examiner—Gilbert W. Reece
Attorney, Agent, or Firm—Joseph Patrick Burke

[57] ABSTRACT

The present disclosure is directed to a tubular metal cart combining ease of manufacture, economy of space and money and utility, particularly for accommodating a plurality of bins designated to contain different types of recyclable trash which are filled in one location and then transported to another location where the trash is picked up for disposal. The trash bin cart has an upper handle portion swept backwardly, a central vertical portion and a floor portion for bearing most of the weight of the individual trash bins. Attached to the upper part of the vertical central portion is a common lid which accommodates the plurality of bins at the collection site. The bin is braced at the rear vertical central portion and side bracing is also provided to connect the lower part of the vertical central portion with the horizontal part of the floor portion. Vertical foot portions, each of which can be provided with a rubber or plastic toe, extend from the horizontal floor portions of the bin.

7 Claims, 1 Drawing Sheet

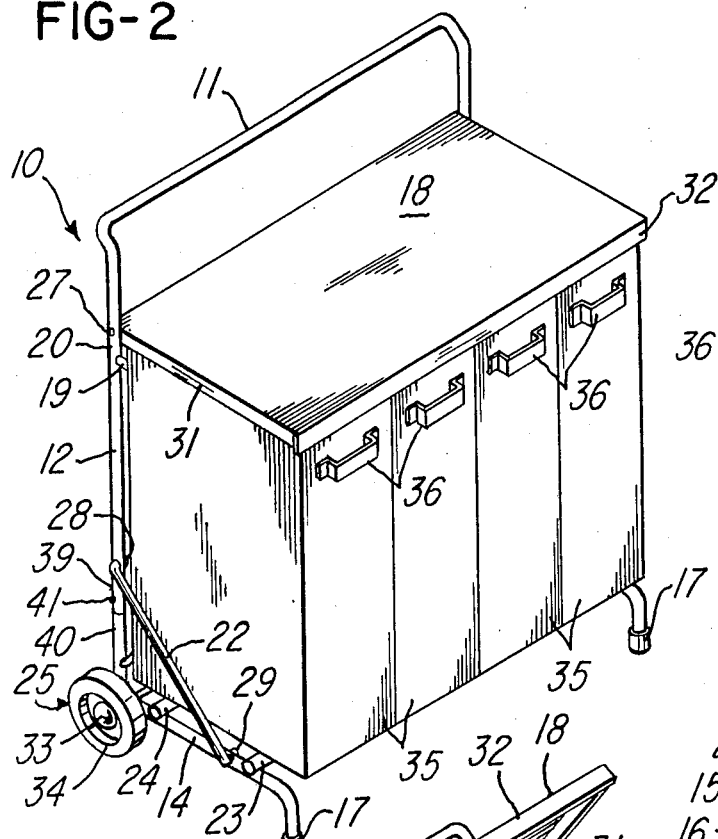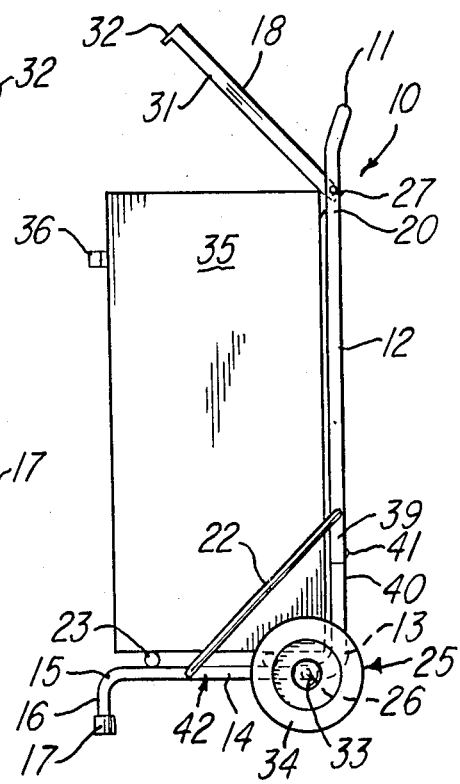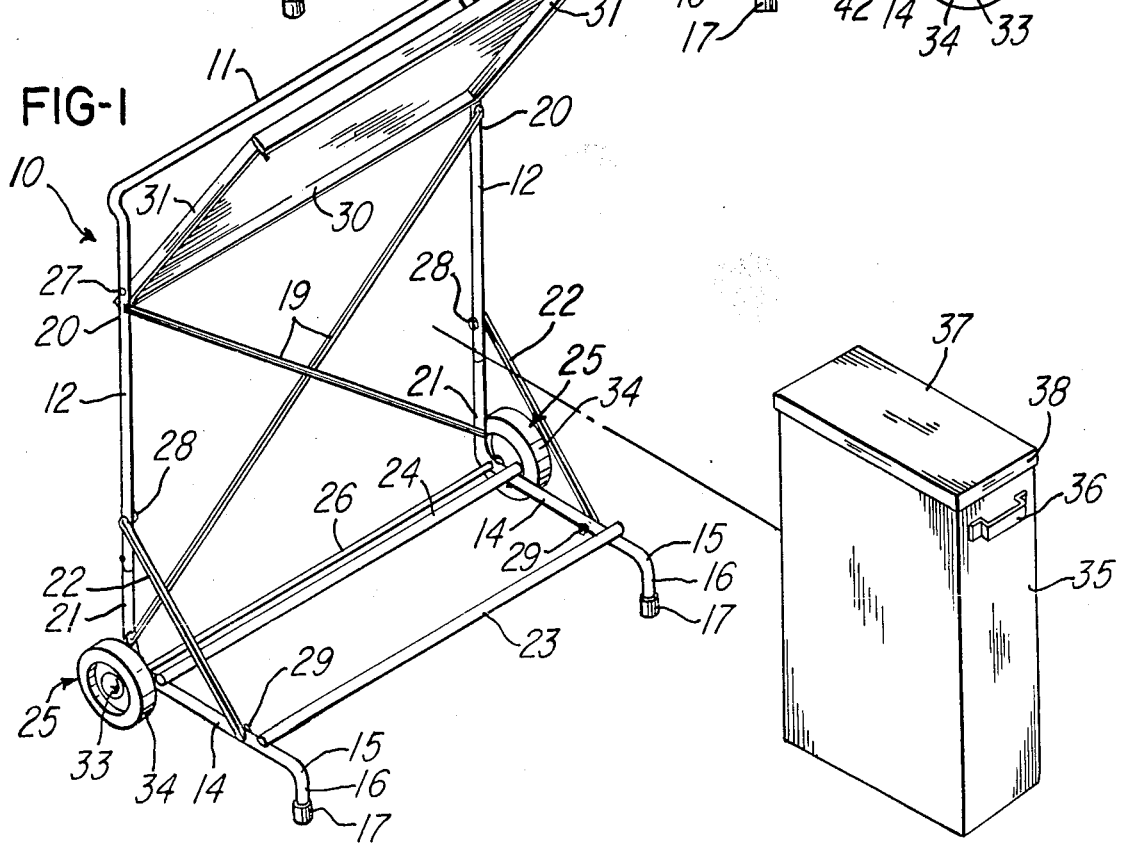

TRASH BIN CART AND BIN ASSEMBLY

BRIEF DESCRIPTION OF THE INVENTION

The present invention is directed to a tubular metal cart combining ease of manufacture, economy of space and money and utility, particularly for accommodating a plurality of bins designated to contain different types of recyclable trash which are collected in one location and then transported on said cart to a location where the trash is picked up for disposal.

The trash bin cart has an upper handle portion swept backwardly, a central vertical portion and a floor portion for bearing most of the weight of the individual trash bins. Attached to the upper part of the vertical central portion is a common lid which accommodates the plurality of bins at the collection site. The bin is braced at the rear vertical central portion and side bracing is also provided to connect the lower part of the vertical central portion with the horizontal part of the floor portion. Vertical foot portions, each of which can be provided with a rubber or plastic toe, extend from the horizontal floor portions of the bin. The system of this invention provides a stable footing for the individual trash bins when it is in the stationary position, viz., both end feet touching the ground and loaded with the individual trash bins ready for collection. Wheels are provided mounted on an axle extending through the area of juncture of the vertical central (lower) portion with the upper portion of the horizontal floor portion of the trash cart. The common lid is hinged to pivot rearwardly allowing positioning of the individual bins prior to dropping the common lid downward to fix the upper forward portion of the bins in place on the trash bin cart.

BACKGROUND OF THE INVENTION AND PRIOR ART

Recently there has been pressure upon home owners and other garbage and trash generators to provide at the home collection site where the trash is collected a plurality of containers so that different parts of trash, e.g. recyclable, may be separated from other types, e.g., non-recyclable. Municipal ordinances, based on environmental and recycling considerations, make the separation of the various type of trash mandatory in some communities. For example, many communities now require homeowners, apartment dwellers, etc., to separate trash into three or four different categories, each being collected by the resident in a plurality of containers. For example, municipal ordinances and regulations have required people to separate paper in one container, metals in another container, glass in a third container and plastic in a fourth container. The separation of these categories of trash enhances the ability of the community to recycle portions of the trash and thereby reduce the community's trash collection cost by sale of recyclable materials.

While such separation of trash is environmentally sound, it presents problems for the residents in such communities.

One solution to the problem, an expensive one, is for such residents to purchase four conventional garbage or trash cans, either metal or plastic. Not only is such a solution expensive, but it usually represents a waste of money in that, e.g., if four conventional, viz., 50-gallon trash cans, are purchased, there is a considerable waste of storage capacity in that the average residential family does not generate that much of each different category of trash between trash pickups. Moreover, another problem is the space requirement these conventional trash cans consume, especially in apartment buildings where space is at a premium, e.g., in highly populated metropolitan areas.

Of course, another solution would be to overlook these ordinances and regulations, but this is unsatisfactory as it would undoubtedly ultimately result in prosecution, fines and possible imprisonment.

Various containers are described in prior art patents as will be indicated below.

U.S. Pat. No. 2,572,486, issued to B. L. Isaac, illustrates a single trash can on wheels with a rear pivoting lid and a handle.

U.S. Pat. No. 3,591,194, issued to Philip Vega, is directed to an ice chest cart on wheels having a plurality of compartments defined by interior walls and having an exterior common outer lid with a provision for an interior lid in a certain compartment.

U.S. Pat. No. 1,432,037, issued to R. F. Russell, is directed to a hand truck fitted with arcuate brake members suitable for handling gas cylinders, e.g., oxygen and acetylene.

U.S. Pat. No. 4,179,132, issued to Robert L. Rich, U.S. Pat. No. 3,460,850, issued to W. E. Franklin, U.S. Pat. No. 3,876,223, issued to James J. O'Reilly et al, U.S. Pat. No. 4,418,930, issued to James J. Ryan, Jr., U.S. Pat. No. 4,625,949, issued to James A. Walker, and U.S. Pat. No. 4,635,950, issued to Richard Le Sage et al, illustrate various types of hand trucks, and various other carts for transporting a variety of different materials. It will be appreciated that none of these patents disclose, describe or suggest the structure of the trash bin cart and assembly with bins as in accordance with this invention. Correspondingly none of these patents teach or describe a structure permitting the attainment of the combination of objectives and advantages which are obtainable with the present invention.

BRIEF DESCRIPTION OF THE DRAWINGS

FIG. 1 is a perspective view showing the trash bin cart of this invention along with an individual trash bin located at the right hand portion of FIG. 1 and isometrically projected to a position on the extreme left hand side of the cart.

FIG. 2 is a perspective view of the trash bin cart of FIG. 1 with the four trash bins in place, each having its individual lid removed and covered by the common lid of the trash bin cart.

FIG. 3 is a side view illustrating the trash bin cart of this invention with one or more trash bins positioned thereon.

DETAILED DESCRIPTION OF THE INVENTION

As will be apparent from FIG. 1, trash bin cart 10 is basically a tubular metal construction and has tubular metal handlebar 11 integral with or separate from and attached to central vertical tubular metal sections 12, the lower parts 39 of which are narrow or crimped at their ends so as to be insertable into the upper parts 40 of each elbow bend 13 portion where sheet metal screws 41 are used to prevent movement. Lower (floor) tubular member 42 is preferably one piece and includes elbow bend portions 13 and 15 with horizontal lower tubular metal portions 14. These horizontal lower tubular metal portions 14 each have an elbow bend 15 into a vertical foot portion 16 with each vertical foot portion being provided with a rubber or plastic toe 17.

Located in the vicinity of the upper end portions 20 of the central vertical sections 12 is a rear pivoting common lid 18 having means 27 to secure said common lid 18 to the upper portions 20 of the central vertical tubular metal sections 12. For example, a pin or a bar can be passed through side flanges 31 of common lid 8 and secured in the vicinity of the upper end portions 20 with grommets, pop rivets (not shown) or any other suitable means to hinge the common lid 18 to the handlebar. Alternatively, the common lid 18 can be directly mounted to upper portions 20 of the tubular metal sections 12, for example, by using sheet metal screws 27 at 20 passing through side flanges 31 of common lid 18 via barrel spacers (not shown) in side flanges 31 and secured using sheet metal nuts (not shown). These sheet metal screws can have their remaining (protruding) portions protected using screw shields on both interior faces of side flanges 31.

One or more circular rod rear cross braces 19, whose ends are bent substantially at right angles and threaded, can be attached to the central vertical sections 12 at the lower end of portions 21 and at the upper end portions 20 by threading the rod ends and bending them substantially at right angles so as to pass through tubular sections 12 where the threaded ends are fastened tight with nuts. A plurality of circular rod side braces 22 are attached to the lower portions of central vertical tubular members 12 by any appropriate means 28, e.g., in the same manner as cross rod braces 19, and to the horizontal lower tubular metal portions 14 by suitable means 29, which can be in the same manner described above with respect to cross rod braces 19.

Front tubular metal floor members 23 are attached to the horizontal lower tubular metal portions 14 at a location near elbow bend 15 and in conjunction with rear tubular metal floor members 24 attached to horizontal lower tubular metal portions 14 at a location near elbow bend 13 provide the floor to carry the majority of the weight of the bins 35 to be carried on the cart 10. These floor members, 23 and 24, can be welded to the horizontal lower tubular metal portions 14, or fastened using sheet metal screws and nuts along with screw shields.

Wheels 25 can be mounted on an axle 26 which passes through the proximal portions of the horizontal portion 14 of lower tubular metal portions 42.

As will be apparent from FIG. 1, common lid 18 has four flanges assisting in fitting it around the outer peripheries of the plurality of trash bins illustrated in FIG. 2. Rear flange 30, side flanges 31, and front flange 32, which can be, and preferably is, longer than its companion flanges 30 and 31, enable close securement of the top portions of the individual bins 35 on the trash cart 10.

The wheels 25 are provided with rubber or plastic tires 34 and wheel caps 33. These wheel caps can be of any desired design or configuration and are removable to permit replacement of axles 26 and lubrication of the axle, if desired.

Each individual trash bin 35, which can be metal or plastic, but preferably is of a tough polyethylene or polypropylene plastic, is provided with a handle 36. Moreover, individual trash bins 35 each may contain its own bin lid 37 having peripheral flanges 38 permitting it to sit on the outer peripheral top of each individual bin 35.

It is contemplated that these various individual bins 35 while on the cart 10 can be placed in a central location in the home to permit the resident utilizing the trash collection system of this invention to separate the trash at the time that it is discarded. Then prior to the scheduled collection by the trash hauler, the individual bin(s) 35 can be removed from the trash cart 10 of this invention and placed at curbside for collection by the trash hauler. Then after collection of the trash, the individual bin(s) 35 can be placed in position on the trash cart 10 and the individual bin lid(s) 37 can be removed therefrom in favor of the common lid 18 which now encompasses the outer periphery defined by the plurality of trash bins 35 now positioned on the cart.

In accordance with a preferred embodiment of this invention handle bar 12 and vertical tubular metal section 12 are integral and are attached to fit into upper portion 40 of lower tubular member 42.

The cart and cart bin assembly of this invention is particularly useful where space and mobility pose problems, e.g., for apartment dwellers. The present invention is convenient and allows the resident to move all containers at one time, e.g., during floor cleaning and at trash pick-up time.

Depending on local ordinances, rules, regulations, etc., the resident may be limited as to the times and frequency at which a recyclable material can be put out for pick-up. The present invention proves for separate storage of cans, glass, plastics and other recyclable materials within the home from the time they are discarded initially until pick-up time. It is envisioned that garbage and trash which is not recyclable is taken out and disposed of by placing it into a larger community can or receptacle until it is collected. In the event local trash collection practices indicate pick-up of different types of recyclable trash on different days of the week, the particular bin picked up on a given day can be removed from the cart and placed at the appropriate pick-up location with the remaining bins left in place on the cart.

It is frequently required that the recyclable trash materials, e.g., metal cans, glass, plastic, etc., be rinsed out with water to obtain comparatively sanitary storage until the scheduled collection day(s). The present invention offers a storage system for recyclable trash which enhances sanitation during such storage.

I claim:

1. A trash bin cart comprising a tubular metal handlebar portion; central vertical tubular metal portions whose lower ends are adapted for fitting into lower tubular metal floor portions; lower tubular metal floor portions having upper and lower elbow bends with an intermediate horizontal portion; a rear pivoting common lid secured to upper end portions of said central vertical portions wherein said common lid has a rear flange, side flanges and a front flange wherein said front flange is longer than said rear and side flanges; circular rod side braces attached to the upper portions of said central vertical tubular portions and said lower tubular floor portions; front and rear tubular metal floor members attached to lower tubular floor portions at locations near said elbow bends joining said lower tubular floor portions with said central vertical tubular metal portions; one or more circular rod rear cross braces attached to said central vertical portions and said lower tubular floor portions; means to secure the upper and lower portions of said side braces to the vertical tubular metal portions and said horizontal lower tubular metal portions; an axle passing through the proximal portions of the horizontal portion of the lower tubular metal floor portions and wheels mounted on said axle.

2. A trash bin cart as in claim 1 wherein each vertical foot portion contains a rubber or plastic toe thereon.

3. A trash bin cart as in claim 1 wherein each said wheel contains a wheel cap.

4. A trash bin cart as in claim 1 wherein each said wheel contains rubber or plastic tires.

5. A trash bin cart as in claim 1 wherein said circular rod braces have ends which are bent substantially at right angles.

6. A trash bin cart as in claim 5 wherein said circular rod braces' ends are threaded for attachment.

7. A trash bin cart assembly comprising a trash bin cart comprising a tubular metal handle-bar portion; central vertical tubular metal portions whose lower ends are adapted for fitting into lower tubular metal floor portions; lower tubular metal floor portions having upper and lower elbow bends with an intermediate horizontal portion; a rear pivoting common lid secured to upper end portions of said central vertical portions; circular rod side braces attached to the upper portions of said central vertical tubular portions and said lower tubular floor portions; front and rear tubular metal floor members attached to lower tubular floor portions at locations near said elbow bends joining said lower tubular floor portions with said central vertical tubular metal portions; one or more circular rod rear cross braces attached to said central vertical portions and said lower tubular floor portions; means to secure the upper and lower portions of said side braces to the vertical tubular metal portions and said horizontal lower tubular metal portions; an axle passing through the proximal portions of the horizontal portion of the lower tubular metal floor portions and wheels mounted on said axle; in combination with a plurality of individual trash bins, each of which has a handle located at the front thereof and whose composite outer peripheral surface is joined by and encompassed by said common lid with the upper outer surfaces (periphery) of said plurality of bins lying within and encompassed by flanges on said common lid.

* * * * *